(12) United States Patent
Borrvall

(10) Patent No.: US 9,405,868 B2
(45) Date of Patent: Aug. 2, 2016

(54) SYSTEMS AND METHODS OF NUMERICALLY SIMULATING STRUCTURAL BEHAVIORS OF AIRBAG MADE OF COATED FABRIC MATERIAL

(71) Applicant: Livermore Software Technology Corporation, Livermore, CA (US)

(72) Inventor: Thomas Borrvall, Linköping (SE)

(73) Assignee: Livermore Software Technology Corp., Livermore, CA (US)

( * ) Notice: Subject to any disclaimer, the term of this patent is extended or adjusted under 35 U.S.C. 154(b) by 800 days.

(21) Appl. No.: 13/721,194

(22) Filed: Dec. 20, 2012

(65) Prior Publication Data

US 2014/0180648 A1   Jun. 26, 2014

(51) Int. Cl.
G06F 17/50 (2006.01)
B60R 21/16 (2006.01)
B60R 21/21 (2011.01)

(52) U.S. Cl.
CPC ............ *G06F 17/5018* (2013.01); *B60R 21/16* (2013.01); *B60R 21/21* (2013.01); *G06F 2217/32* (2013.01); *G06F 2217/42* (2013.01); *G06T 2210/16* (2013.01)

(58) Field of Classification Search
None
See application file for complete search history.

(56) References Cited

U.S. PATENT DOCUMENTS

2005/0264562 A1*  12/2005  Macura .................... G06F 17/50
                                                            345/420
2009/0012749 A1*  1/2009  Ornjanovic ......... G06F 17/5018
                                                            703/1

OTHER PUBLICATIONS

L. Bao, et al., "Impact Force When Fabric Inflates at High Speed," Textile Research Journal, vol. 70, No. 9, 2009, pp. 837-843.*
K. Bathe "Finite Element Procedures," Prentice Hall, 1996, 1052 pages.*
K. Bathe, et al., "An Evaluation of the MITC Shell Elements," Computers and Structures, vol. 75, 2000, pp. 1-30.*
Abaqus, Appendix 2, "Shell Elements in ABAQUS/Explicit," iMechanica, imechanica.org/files/appendix2-shells_2.pdf, Copyright 2005 ABAQUS, Inc. ABAQUS/Explicit, 17 pages.*
S. Reese, et al., "Finite Element Modelling of Orthotropic Material Behaviour in Pneumatic Membranes," International Journal of Solids and Structures, vol. 38, 2001, pp. 9525-9544.*

* cited by examiner

*Primary Examiner* — Kamini S Shah
*Assistant Examiner* — David M Rogers
(74) *Attorney, Agent, or Firm* — Roger H. Chu

(57) ABSTRACT

Methods of numerically simulating structural behaviors of airbag made of coated fabric material are disclosed. A special purpose finite element is configured to include a membrane element and a pair of dynamically configured slave elements, which provides additional bending resistance of the coated fabric material. At each solution cycle of a time-marching simulation, nodal locations of the slave elements are updated from corresponding averaged nodal normal vector, fabric thickness and coating thickness of the coated fabric material. The averaged nodal normal vector of a particular node is an average of element normal vector of those membrane elements connected to that particular node. Respective nodal locations are offset at a distance at either side of the corresponding node of the membrane element along the averaged normal vector. Using updated nodal locations, strains and stresses of the slave elements are obtained and then converted to internal nodal forces for additional bending resistance.

15 Claims, 6 Drawing Sheets

SYSTEMS AND METHODS OF NUMERICALLY SIMULATING STRUCTURAL BEHAVIORS OF AIRBAG MADE OF COATED FABRIC MATERIAL

FIELD OF THE INVENTION

The present invention generally relates to computer aided engineering analysis, more particularly to methods and systems for numerically simulating structural behaviors of airbag made of coated fabric material (e.g., inflating an airbag during an automobile collision).

BACKGROUND OF THE INVENTION

Airbag is installed in an automobile for rapidly inflating to a flexible envelope in a car crash to prevent vehicle occupants from striking interior objects such as the steering wheel or a window. Modern vehicles may contain multiple airbags in various side and frontal locations of the passenger seating positions and sensors may deploy one or more airbags in an impact zone at variable rates based on the type and severity of impact. Frontal airbags for driver and passenger are generally made of uncoated fabrics while the side and side curtain airbags are made of coated fabrics with low air permeability for side impact.

With advent of computing technologies, airbag is designed using computer aided engineering analysis (e.g., a finite element analysis (FEA). Membrane finite elements have been used for representing airbags. While this technique works for simulating airbags made of uncoated fabric, it does not work well for coated fabric. The reason is because membrane elements do not possess any bending stiffness or resistance provided by coated fabric. As a result, the simulated airbag has higher tendency of folding when membrane elements are used.

In prior approaches, either conventional shell finite elements with modifications to bending terms or adding a weak shell element to each membrane element to capture the additional bending resistance of coated fabric is used. Neither of these prior art approaches is satisfactory because significant computation time (e.g., doubling the amount of computation costs of a membrane element model) are required thereby prolonging design process and increasing the costs.

It would therefore be desirable to have more efficient methods and systems for numerically simulating structural behaviors of airbag made of coated fabric material.

SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems, methods and software product for numerically simulating structural behaviors of airbag made of coated fabric material are disclosed. According to one aspect of the present invention, a special purpose finite element is configured for simulating the structural behaviors of coated fabric material. The special purpose finite element includes a membrane element and a pair of slave elements. The membrane element alone would represent uncoated fabric material. The slave elements are dynamically configured for providing additional bending resistance of the coated fabric material. At each solution cycle of a time-marching simulation of obtaining simulated structural behaviors of an airbag, nodal locations of the slave elements are updated from corresponding averaged nodal normal vector, fabric thickness and coating thickness of the coated fabric material. The averaged nodal normal vector of a particular node is an average of element normal vector of those membrane elements connected to that particular node. The slave elements contain same number of nodes of the corresponding membrane element. Respective nodal locations are offset at a distance at either side of the corresponding node of the membrane element along the averaged normal vector. Using updated nodal locations, strains and stresses of the slave elements can be obtained via traditional finite element approach/method. The obtained strains and stresses are then converted to internal nodal forces of the corresponding membrane element for the additional bending resistance.

In other words, the present invention enables users (e.g., scientists and engineers who design and/or analyze airbag performance) to use the traditional modeling methodology (i.e., using membrane elements to represent an airbag). According to another aspect of the invention, additional bending resistance is added to the membrane elements without requiring extra bending degrees-of-freedom (which is required in prior art approaches).

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1-7. However, those skilled in the art will readily appreciate that the detailed description given herein with respect to these figures is for explanatory purposes as the invention extends beyond these limited embodiments.

Figure 1:
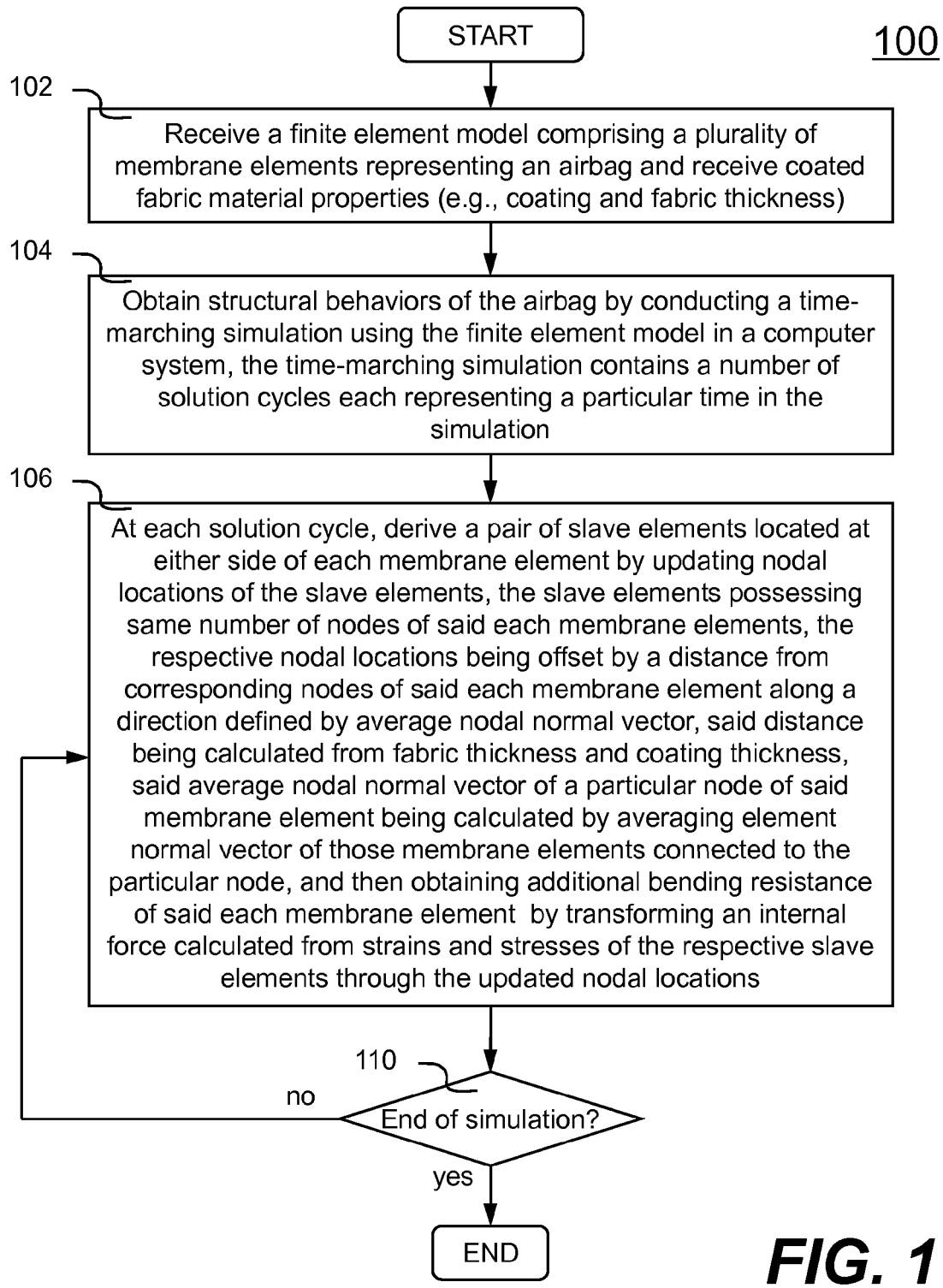
FIG. 1 is a flowchart illustrating an exemplary process of numerically simulating structural behaviors of airbag made of coated fabric material, according to an embodiment of the present invention

FIG. 1 is a flowchart illustrating an exemplary process 100 of numerically simulating structural behaviors of an airbag made of coated fabric material, according to an embodiment of the present invention. Process 100 is preferably understood in conjunction with the previous figures and is implemented in software.

Process 100 starts by receiving a computerized model (e.g., finite element analysis model) of an airbag made of coated fabric material and material properties of the coated fabric material in a computer system (e.g., computer 700 of FIG. 7) at step 102. The material properties of coated fabric material include, but are not limited to, fabric thickness and coating thickness, elastic modulus and strength (e.g., yield stress).

Figure 2A:
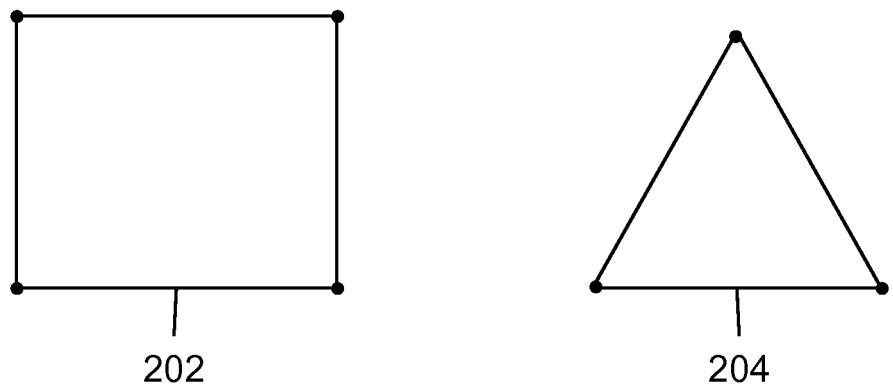
FIG. 2A shows two exemplary shapes of a membrane element, according to an embodiment of the present invention.
Figure 2B:
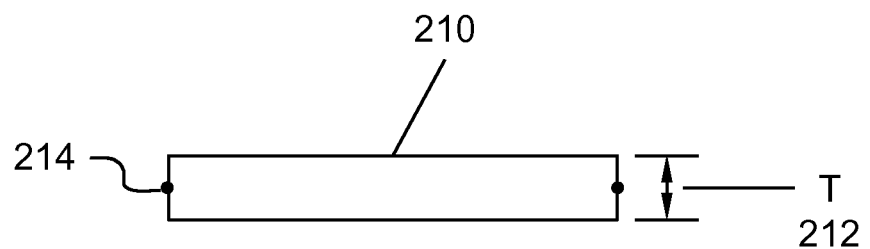
FIG. 2B shows cross-sectional profile of the membrane element shown in FIG. 2A.
Figure 3:
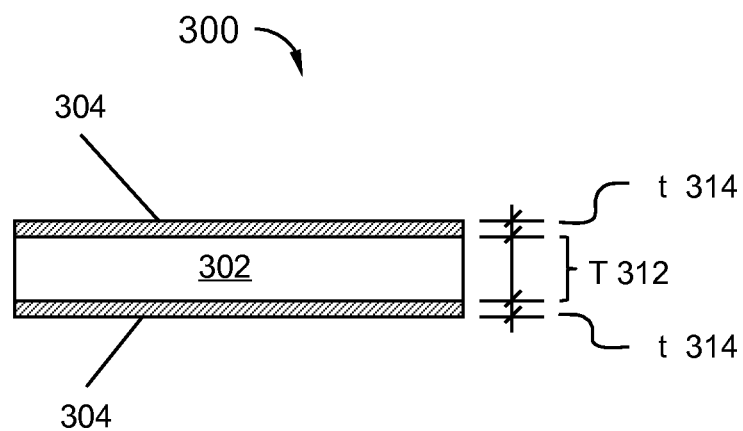
FIG. 3 is a diagram showing a cross-sectional profile of an exemplary special purpose element that includes a membrane element and a pair of dynamically configured slave elements, according to an embodiment of the present invention.
Figure 4:
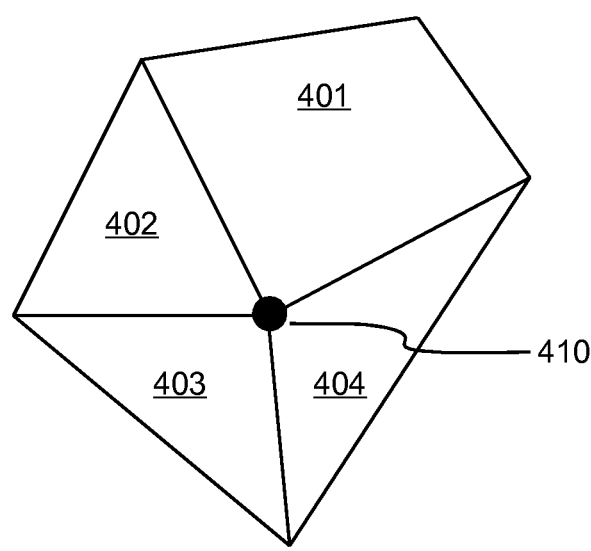
FIG. 4 is a diagram showing an exemplary plurality of membrane element connected to a particular node in accordance with one embodiment of the present invention.

The computerized model comprises at least a plurality of membrane finite elements (e.g., quadrilateral element 202, triangular element 204 shown in FIG. 2A, etc.) representing an airbag. Membrane element contains only translational degrees-of-freedom without any bending resistance, thereby insufficient to represent true structural behaviors of coated fabric material. A cross-sectional profile of an exemplary membrane element 210 is shown in FIG. 2B. Thickness (T) 212 of the membrane element corresponds to the fabric thickness. It is noted that the nodes 214 of the membrane element 210 are located in the mid-height of the thickness direction.

According to one embodiment of the present invention, to provide additional bending resistance to each membrane element 302, a pair of dynamically-configured slave elements 304 are added to form the special purpose element 300 (shown in FIG. 3) for simulating structural behaviors of the coated fabric material. Thickness (T) 312 of the membrane element 302 is the fabric thickness, while thickness (t) 314 of the slave elements is the coating thickness.

Figure 5A:
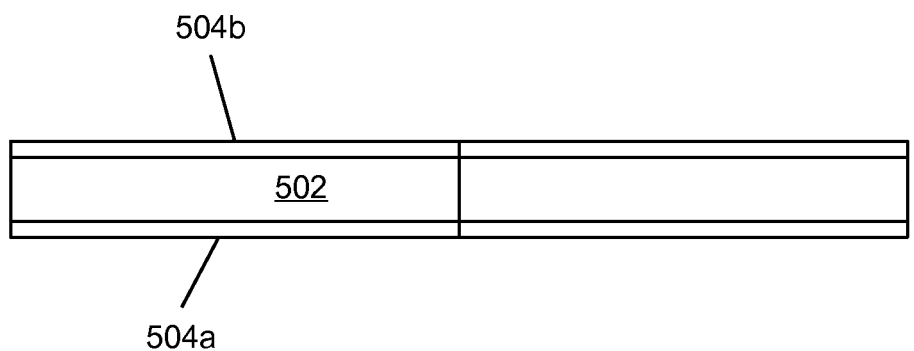
FIGS. 5A and 5B are diagrams showing cross-sectional profiles of initial and deformed configurations of an exemplary special purpose element, according to an embodiment of the present invention.
Figure 5B:
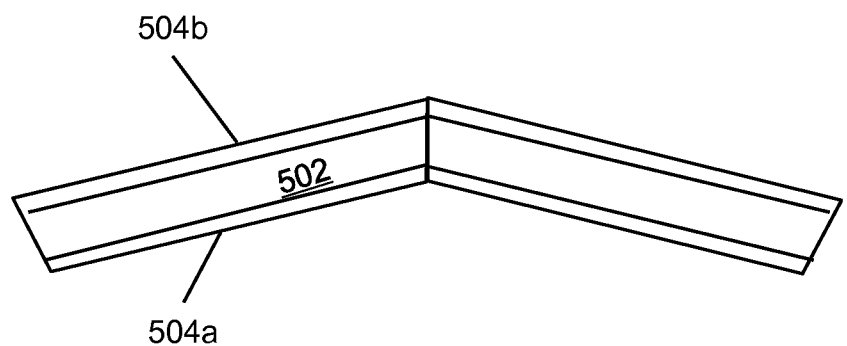

FIGS. 5A-5B show respective cross-sectional profiles of initial and deform configuration of a finite element model containing two special purpose elements, respectively. Each special purpose element contains a membrane element 502 and a pair of slave elements 504a and 504b shown in the initial undeformed configuration in FIG. 5A. When the finite element model is bent shown in FIG. 5B, first slave element 504a compresses while the second slave element 504b stretches, thereby storing energy and preventing this motion (i.e., adding bending resistance to the membrane element 502).

At step 104, a time-marching simulation is conducted for a number of solution cycles to obtain structural behaviors of an airbag (e.g., inflating an airbag). Each solution cycle represents a particular time in the time-marching simulation. The received finite element model is used in a computer system 700 having a finite element analysis application module (e.g., application module 706) installed thereon.

Figure 6A:
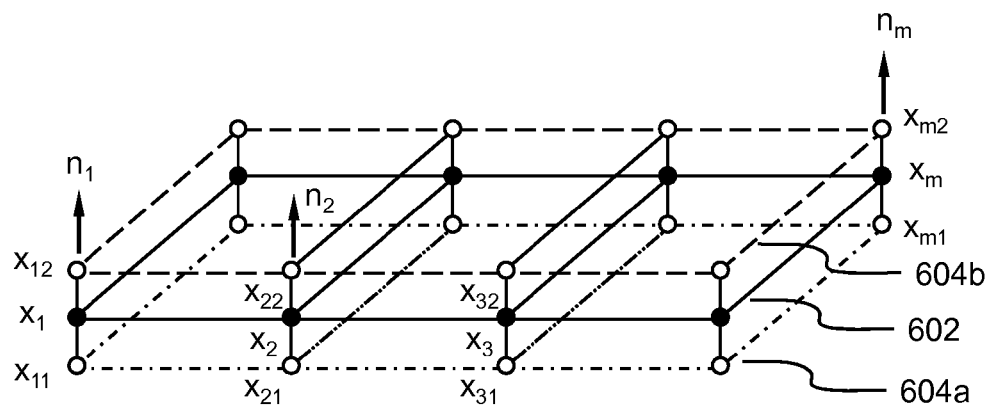
FIG. 6A is a three-dimensional diagram showing an exemplary finite element model comprising special purpose elements in an initial configuration, according to an embodiment of the present invention.
Figure 6B:
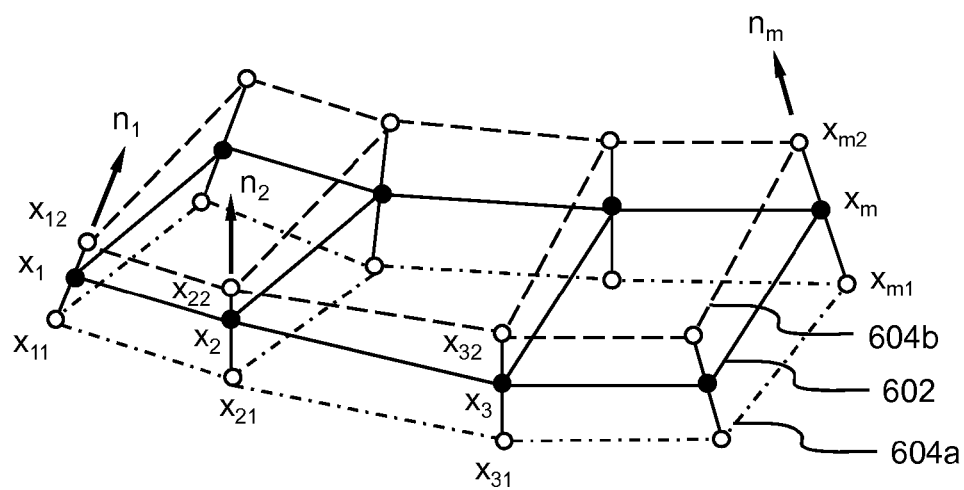
FIG. 6B is a diagram showing the finite element model of FIG. 6A in a deformed configuration.

Next at step 106, at each solution cycle, a pair of slave elements located at either side of each membrane element is derived by updating nodal locations or coordinates of the slave elements. The slave elements are configured to have the same number of the nodes of the corresponding membrane element. Respective nodal locations are offset by a distance from the corresponding node of the membrane element along a direction defined by the average nodal normal vector (e.g., $n_1, n_2, n_m$ in FIG. 6A) for that node. In other words, the slave elements 604a-b are located on opposite sides of the membrane element 602. An exemplary finite element model having three special purpose elements is shown in FIG. 6A. It is noted that respective nodes (e.g., $x_{11}$ and $x_{12}$) of the slave elements 604a-b are offset at an equal distance from the corresponding node ($x_1$) of the membrane element 602. A deformed configuration of the finite element model of FIG. 6A is shown in FIG. 6B.

The offset distance is calculated from the material properties of coated fabric material as one half of the fabric and coating thickness. The following formula/equation is used for determining the nodal locations ($x_{ij}$) or coordinates of the slave elements.

$$x_{ij} = x_i + (-1)^j n_i (t+T)/2, j=1, 2 \text{ and } i=1, m$$

where:
- $x_i$ denotes nodal coordinates of said each membrane element,
- m denotes total number of nodes in the finite element model,
- $n_i$ denotes the average nodal normal vector.
- T denotes the fabric thickness,
- t denotes the coating thickness, and
- j represents one of the slave elements (j=1 for first slave element, 2 for second slave element).

It is noted that the nodal locations of two slave elements are located at opposite sides of the corresponding node of the membrane element.

The average nodal normal vector of a particular node is defined by averaging element normal vector of those membrane elements that connected to that particular node. For example, shown in FIG. 4, membrane elements 401-404 are connected to node 410. The average nodal normal vector at node 410 is calculated by averaging four element normal vectors of membrane elements 401-404.

After the nodal locations of the slave elements have been determined, additional bending resistance of the membrane element is obtained by transforming an internal force calculated from stresses and strains of the slave elements via the updated nodal locations/coordinates. This can be done with well-known techniques such as finite element theory.

Finally, process 100 moves to decision 110, it is determined whether the time-marching simulation has ended or not. For example, a predetermined end condition is checked. If it has not reached the end, process 100 follows the "no" branch back to step 106 to continue the time-marching simulation for another solution cycle. Otherwise, process 100 ends. One exemplary predetermined end condition is the total simulation time, for example, 100 ms for an automobile collision event.

Figure 7:
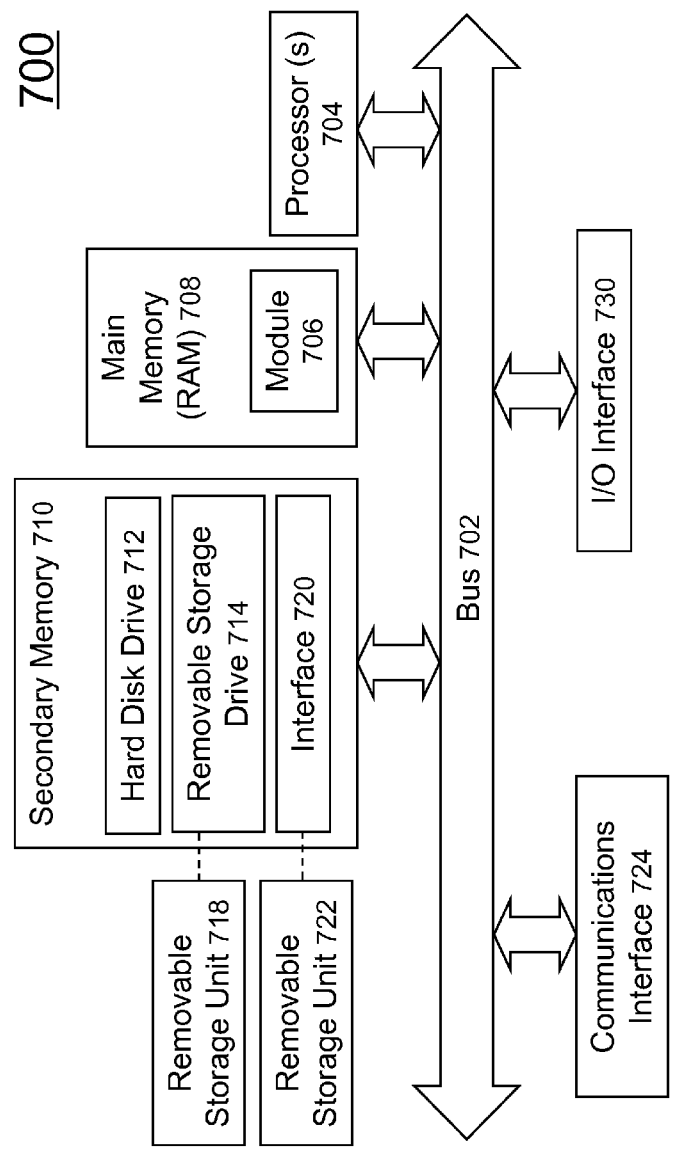
FIG. 7 is a function diagram showing salient components of an exemplary computer, in which one embodiment of the present invention may be implemented.

According to one aspect, the present invention is directed towards one or more computer systems capable of carrying out the functionality described herein. An example of a computer system 700 is shown in FIG. 7. The computer system 700 includes one or more processors, such as processor 704. The processor 704 is connected to a computer system internal communication bus 702. Various software embodiments are described in terms of this exemplary computer system. After reading this description, it will become apparent to a person skilled in the relevant art(s) how to implement the invention using other computer systems and/or computer architectures.

Computer system 700 also includes a main memory 708, preferably random access memory (RAM), and may also include a secondary memory 710. The secondary memory 710 may include, for example, one or more hard disk drives 712 and/or one or more removable storage drives 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 722 and interfaces 720 which allow software and data to be transferred from the removable storage unit 722 to computer system 700. In general, Computer system 700 is controlled and coordinated by operating system (OS) software, which performs tasks such as process scheduling, memory management, networking and I/O services.

There may also be a communications interface 724 connecting to the bus 702. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. The computer 700 communicates with other computing devices over a data network based on a special set of rules (i.e., a protocol). One of the common protocols is TCP/IP (Transmission Control Protocol/Internet Protocol) commonly used in the Internet. In general, the communication interface 724 manages the assembling of a data file into smaller packets that are transmitted over the data network or reassembles received packets into the original data file. In addition, the communication interface 724 handles the address part of each packet so that it gets to the right destination or intercepts packets destined for the computer 700. In this document, the terms "computer program medium" and "computer usable medium" are used to generally refer to media such as removable storage drive 714, and/or a hard disk installed in hard disk drive 712. These computer program products are means for providing software to computer system 700. The invention is directed to such computer program products.

The computer system 700 may also include an input/output (I/O) interface 730, which provides the computer system 700 to access monitor, keyboard, mouse, printer, scanner, plotter, and alike.

Computer programs (also called computer control logic) are stored as application modules 706 in main memory 708 and/or secondary memory 710. Computer programs may also be received via communications interface 724. Such computer programs, when executed, enable the computer system 700 to perform the features of the present invention as discussed herein. In particular, the computer programs, when executed, enable the processor 704 to perform features of the present invention. Accordingly, such computer programs represent controllers of the computer system 700.

In an embodiment where the invention is implemented using software, the software may be stored in a computer program product and loaded into computer system 700 using removable storage drive 714, hard drive 712, or communications interface 724. The application module 706, when executed by the processor 704, causes the processor 704 to perform the functions of the invention as described herein.

The main memory 708 may be loaded with one or more application modules 706 that can be executed by one or more processors 704 with or without a user input through the I/O interface 730 to achieve desired tasks. In operation, when at least one processor 704 executes one of the application modules 706, the results are computed and stored in the secondary memory 710 (i.e., hard disk drive 712). The status of the finite element analysis is reported to the user via the I/O interface 730 either in a text or in a graphical representation.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas the exemplary model shown in FIG. 6 contains only three special purpose elements, the present invention does not set any limit to number of elements in a computerized model used for representing an airbag. Additionally, whereas none of the examples shown as an envelope or closed volume for illustration and explanation simplicity, a computerized model representing an airbag should be a closed volume or an envelope. Further, whereas the example for calculating nodal normal vector has four membrane elements, the present invention allows any other number of elements. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of obtaining simulated structural behaviors of an airbag made of coated fabric material comprising:

receiving, in a computer system having a finite element analysis (FEA) application module installed thereon, a finite element model containing a plurality of membrane elements representing an airbag made of coated fabric material and receiving a coating thickness and a fabric thickness of the coated fabric material;

obtaining simulated structural behaviors of the airbag by conducting a time-marching simulation using the finite element model with the FEA application module, said time-marching simulation containing a number of solution cycles with each solution cycle representing a particular time of the time-marching simulation, wherein the simulated structural behaviors are used for designing airbags to ensure vehicle occupants safety in a car crash; and at said each solution cycle, creating a pair of slave elements located at either side of each membrane element by updating nodal locations of the slave elements, each of the slave elements being configured to possess same number of nodes as that of said each membrane element, the respective nodal locations being offset by a distance from corresponding nodes of said each membrane element along a direction defined by an average nodal normal vector, said distance being calculated from the fabric thickness and the coating thickness, said average nodal normal vector of a particular node being calculated by averaging element normal vectors of those membrane elements connected to the particular node, and then incorporating additional bending resistance caused by complementary stretching and shrinking of the pair of slave elements into said each membrane element, wherein said additional bending resistance is computed by transforming an internal force calculated from strains and stresses of the respective slave elements through the updated nodal locations, and said additional bending resistance is used for representing a portion of the simulated structural behaviors due to the coating fabric material's coating, wherein said nodal locations of the pair of slave elements are calculated with the following formula:

$$x_{ij}=x_i+(-1)^j n_i(t+T)/2, j=1,2 \text{ and } i=1,m$$

where $x_i$ denotes nodal coordinates of said each membrane element, m denotes the total number of nodes in the finite element model, $n_i$ denotes the average nodal normal vector, T denotes the fabric thickness, t denotes the coating thickness, and j represents one of the slave elements.

2. The method of claim 1, wherein said each membrane element possesses no bending resistance.

3. The method of claim 1, wherein said each membrane element comprises two-dimensional triangular element.

4. The method of claim 1, wherein said each membrane element comprises two-dimensional quadrilateral element.

5. The method of claim 1, wherein each of said slave elements comprises same shape of said each membrane element.

6. The method of claim 1, further comprises ending said time-marching simulation when a predetermined termination condition has been met.

7. The method of claim 1, wherein said creating the pair of slave elements enables the finite element model to represent the coated fabric material without using shell finite element requiring bending degrees-of-freedom.

8. A system for obtaining simulated structural behaviors of an airbag made of coated fabric material comprising:

a main memory for storing computer readable code for a finite element analysis (FEA) application module;

at least one processor coupled to the main memory, said at least one processor executing the computer readable code in the main memory to cause the finite element analysis application module to perform operations by a method of:

receiving a finite element model containing a plurality of membrane elements representing an airbag made of coated fabric material and receiving a coating thickness and a fabric thickness of the coated fabric material;

obtaining simulated structural behaviors of the airbag by conducting a time-marching simulation using the finite element model, said time-marching simulation containing a number of solution cycles with each solution cycle representing a particular time of the time-marching simulation, wherein the simulated structural behaviors are used for designing airbags to ensure vehicle occupants safety in a car crash; and at said each solution cycle, creating a pair of slave elements located at either side of each membrane element by updating nodal locations of the slave elements, each of the slave elements being configured to possess same number of nodes as that of said each membrane element, the respective nodal locations being offset by a distance from corresponding nodes of said each membrane element along a direction defined by an average nodal normal vector, said distance being calculated from the fabric thickness and the coating thickness, said average nodal normal vector of a particular node being calculated by averaging element normal vectors of those membrane elements connected to the particular node, and then incorporating additional bending resistance caused by complementary stretching and shrinking of the pair of slave elements into said each membrane element, wherein said additional bending resistance is computed by transforming an internal force calculated from strains and stresses of the respective slave elements through the updated nodal locations, and said additional bending resistance is used for representing a portion of the simulated structural behaviors due to the coating fabric material's coating, wherein said nodal locations of the pair of slave elements are calculated with the following formula:

$$x_{ij}=x_i+(-1)^j n_i(t+T)/2, j=1,2 \text{ and } i=1,m$$

where $x_i$ denotes nodal coordinates of said each membrane element, m denotes the total number of nodes in the finite element model, $n_i$ denotes the average nodal normal vector, T denotes the fabric thickness, t denotes the coating thickness, and j represents one of the slave elements.

9. The system of claim 8, wherein said each membrane element possesses no bending resistance.

10. The system of claim 8, further comprises ending said time-marching simulation when a predetermined termination condition has been met.

11. The system of claim 8, wherein said creating the pair of slave elements enables the finite element model to represent the coated fabric material without using shell finite element requiring bending degrees-of-freedom.

12. A non-transitory computer readable storage medium containing instructions, when executed in a computer system, for obtaining simulated structural behaviors of an airbag made of coated fabric material by a method comprising:

receiving, in a computer system having a finite element analysis application module installed thereon, a finite element model containing a plurality of membrane elements representing an airbag made of coated fabric material and receiving a coating thickness and a fabric thickness of the coated fabric material;

obtaining simulated structural behaviors of the airbag by conducting a time-marching simulation using the finite element model with the FEA application module, said time-marching simulation containing a number of solution cycles with each solution cycle representing a particular time of the time-marching simulation, wherein the simulated structural behaviors are used for designing airbags to ensure vehicle occupants safety in a car crash; and at said each solution cycle, creating a pair of slave elements located at either side of each membrane element by updating nodal locations of the slave elements, each of the slave elements being configured to possess same number of nodes as that of said each membrane element, the respective nodal locations being offset by a distance from corresponding nodes of said each membrane element along a direction defined by an average nodal normal vector, said distance being calculated from the fabric thickness and the coating thickness, said average nodal normal vector of a particular node being calculated by averaging element normal vectors of those membrane elements connected to the particular node, and then incorporating additional bending resistance caused by complementary stretching and shrinking of the pair of slave elements into said each membrane element, wherein said additional bending resistance is computed by transforming an internal force calculated from strains and stresses of the respective slave elements through the updated nodal locations, and said additional bending resistance is used for representing a portion of the simulated structural behaviors due to the coating fabric material's coating, wherein said nodal locations of the pair of slave elements are calculated with the following formula:

$$x_{ij} = x_i + (-1)^j n_i (t+T)/2, \; j=1,2 \text{ and } i=1,m$$

where
  $x_i$ denotes nodal coordinates of said each membrane element,
  m denotes the total number of nodes in the finite element model,
  $n_i$ denotes the average nodal normal vector,
  T denotes the fabric thickness,
  t denotes the coating thickness, and
  j represents one of the slave elements.

13. The non-transitory computer readable storage medium of claim 12, wherein said each membrane element possesses no bending resistance.

14. The non-transitory computer readable storage medium of claim 12, further comprises ending said time-marching simulation when a predetermined termination condition has been met.

15. The non-transitory computer readable storage medium of claim 12, wherein said creating the pair of slave elements enables the finite element model to represent the coated fabric material without using shell finite element requiring bending degrees-of-freedom.

* * * * *